May 1, 1923.

E. J. RETZBACH

ICE CREAM BRICKING MACHINE

Filed June 11, 1917    8 Sheets-Sheet 1

1,453,407

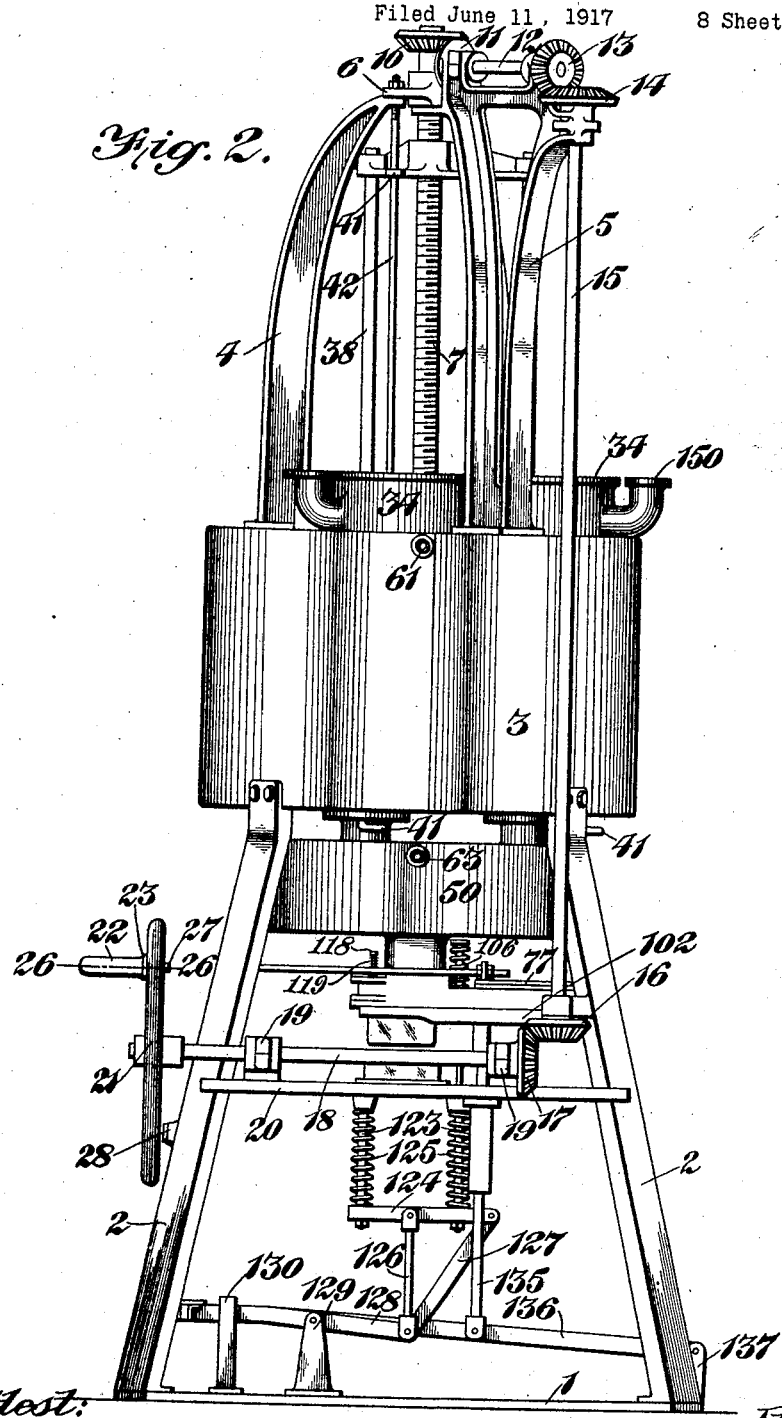

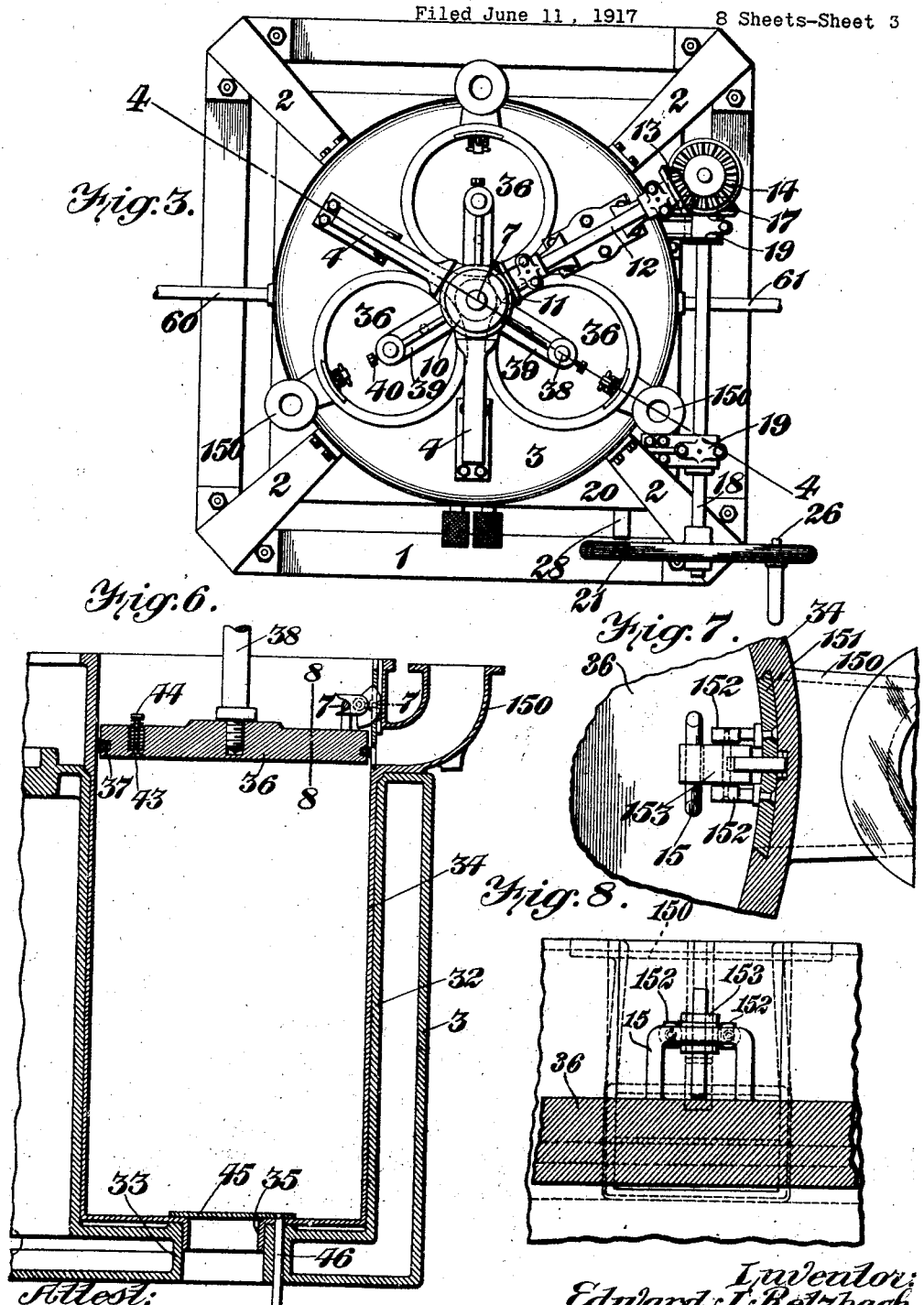

May 1, 1923.
E. J. RETZBACH
ICE CREAM BRICKING MACHINE
Filed June 11, 1917     8 Sheets-Sheet 4
1,453,407
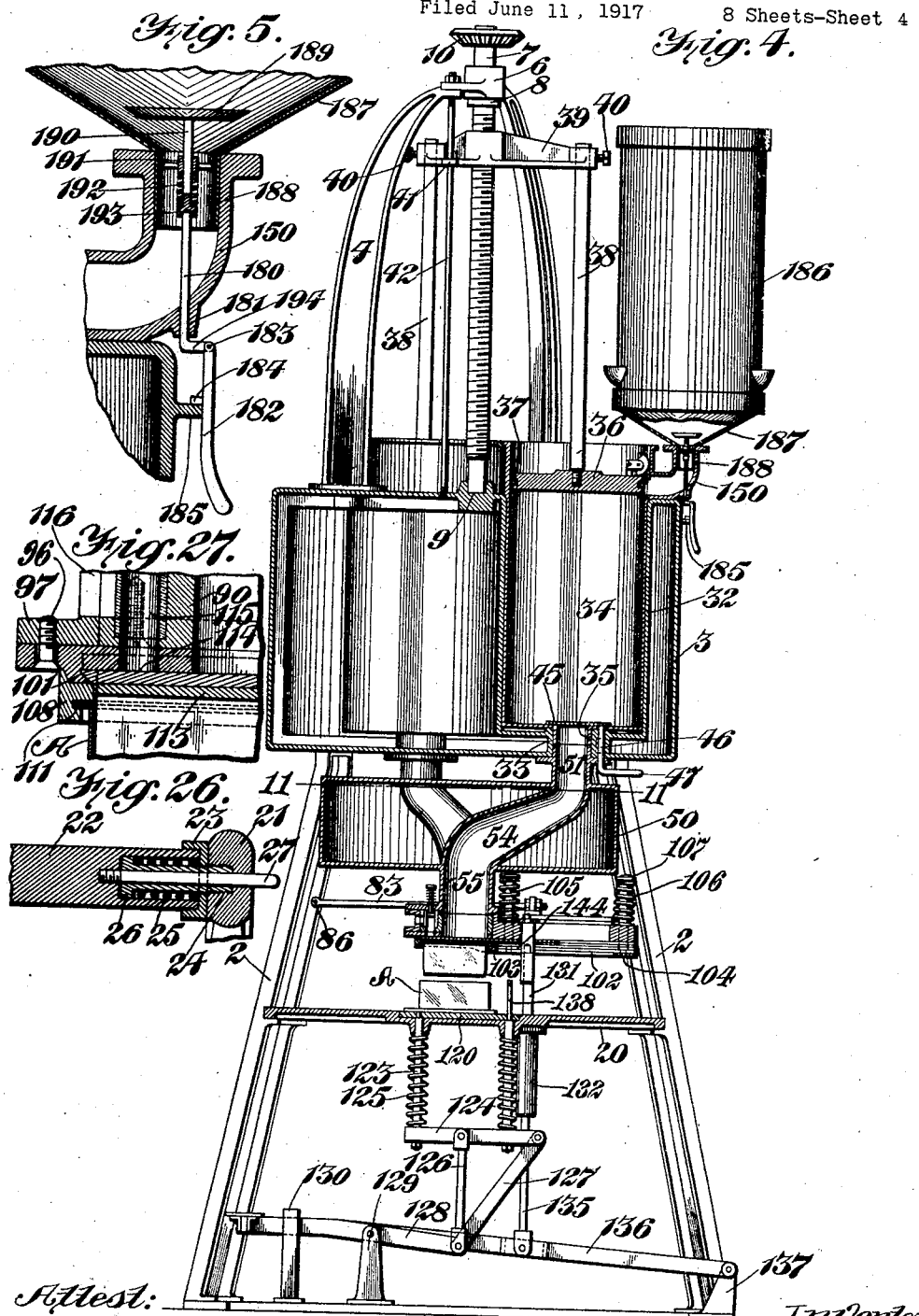

May 1, 1923.
E. J. RETZBACH
ICE CREAM BRICKING MACHINE
Filed June 11, 1917
1,453,407
8 Sheets-Sheet 5
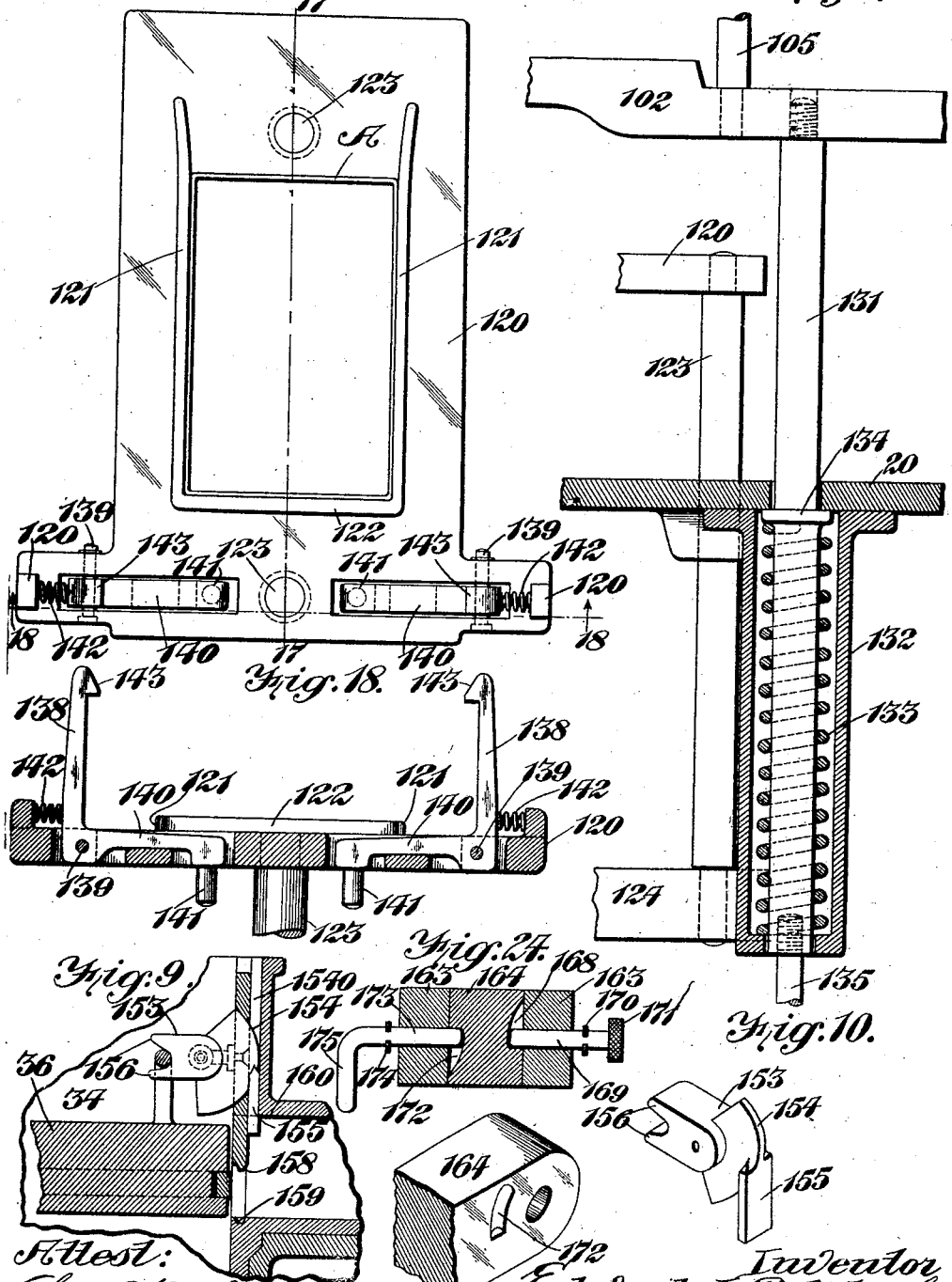

May 1, 1923.

E. J. RETZBACH 1,453,407

ICE CREAM BRICKING MACHINE

Filed June 11, 1917

Witness:
Chas. A. Becker
Harry H. Reiss

Inventor:
Edward J. Retzbach
by John H. Bruninga
His Attorney

May 1, 1923.
E. J. RETZBACH
1,453,407
ICE CREAM BRICKING MACHINE
Filed June 11, 1917   8 Sheets-Sheet 7
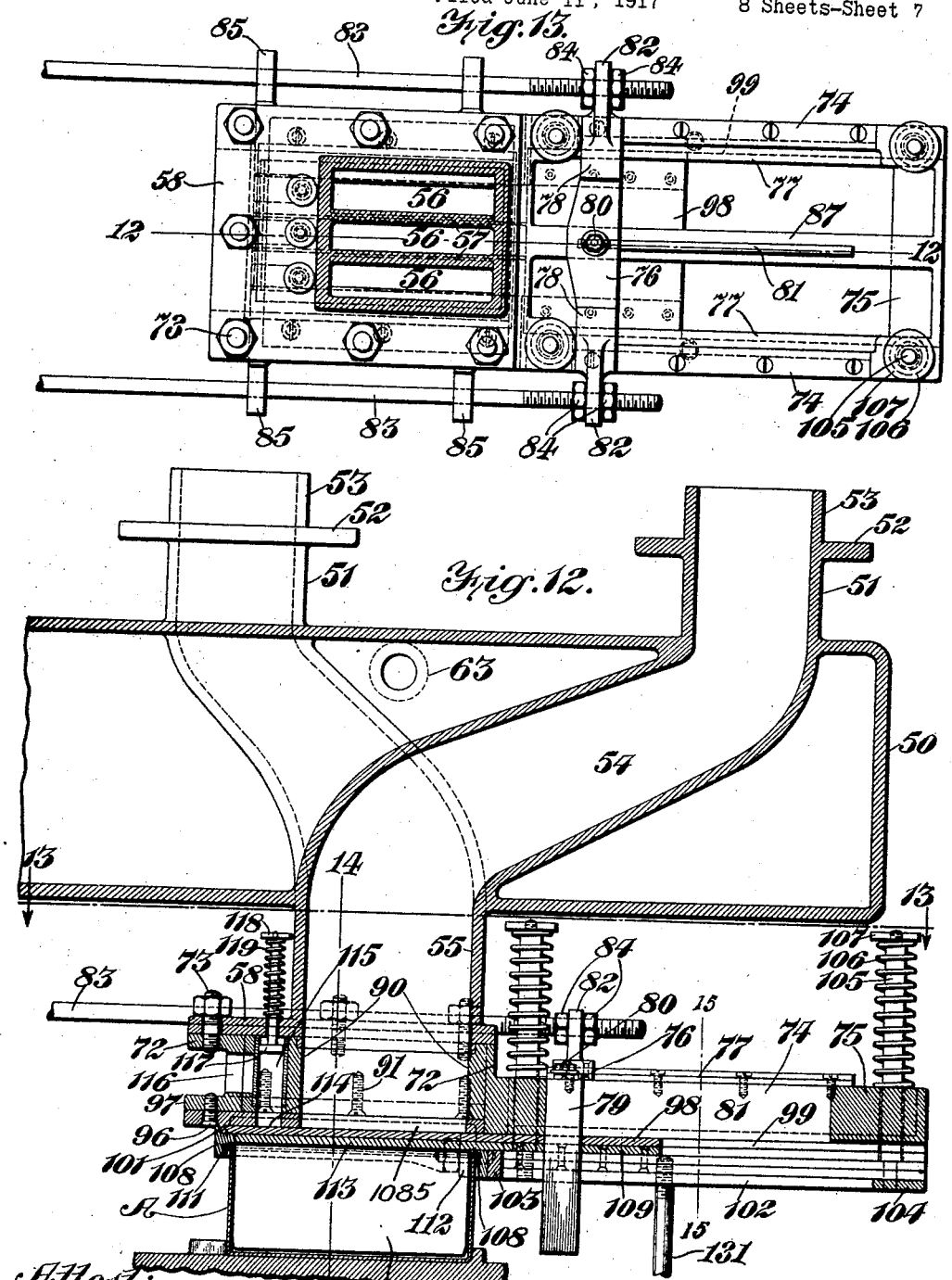

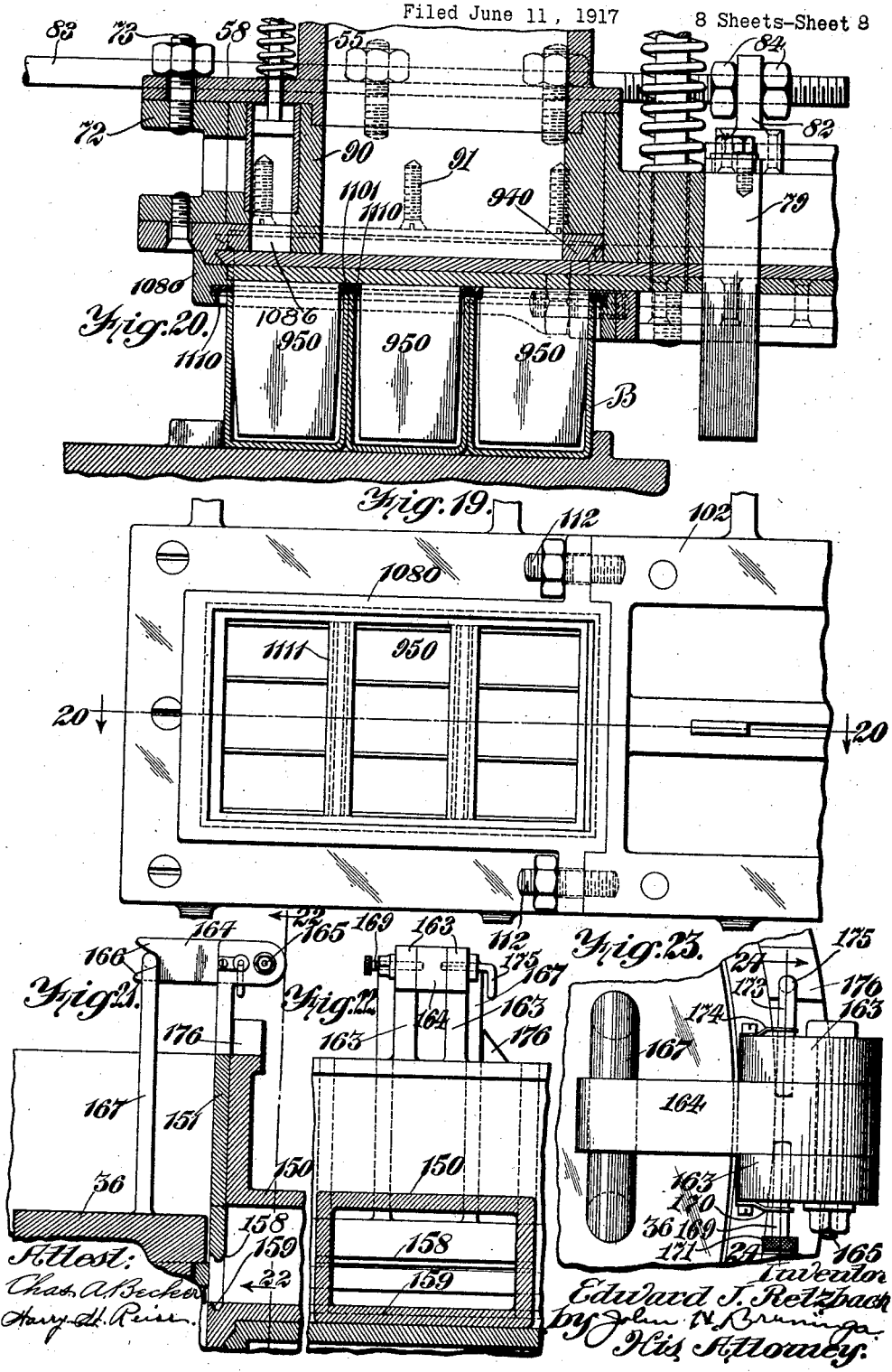

Patented May 1, 1923.

1,453,407

UNITED STATES PATENT OFFICE.

EDWARD J. RETZBACH, OF ST. LOUIS, MISSOURI, ASSIGNOR, BY DIRECT AND MESNE ASSIGNMENTS, TO MOJONNIER BROS. CO., OF CHICAGO, ILLINOIS, A CORPORATION OF ILLINOIS.

ICE-CREAM-BRICKING MACHINE.

Application filed June 11, 1917. Serial No. 174,002.

*To all whom it may concern:*

Be it known that I, EDWARD J. RETZBACH, a citizen of the United States, and residing at St. Louis, in the State of Missouri, have invented a certain new and useful Improvement in Ice-Cream-Bricking Machines, of which the following is a specification.

This invention relates to apparatus for packaging ice cream in semi-frozen condition for hardening in the package and for delivery to the ultimate consumers:

In the packaging of the product, it is highly desirable that, throughout the entire operation, sanitary methods of handling the material should be observed; that the material while being handled should not come into contact with other materials which might injuriously affect the flavor of the product; that, in the production of multiple layer bricks and in order to impart to them the requisite attractive appearance, their component layers should be of uniform thickness and the distinctive character of these layers preserved; and that the product should be discharged from the machine directly into boxes or cartons in which they are to be sold, thus preserving sanitation to the conclusion of handling the material.

Among former methods practiced in molding the product, some are objectionable because of their unsanitary nature, the loss of time which they involve, and exposure of the product to materials tending to impair their flavor, while prior methods, contemplating the formation of multiple layer bricks, are further objectionable, due to the layers being unevenly distributed with the material of adjacent layers intermingled.

This invention has among its objects to attain the desired ends and overcome the objections noted, by providing a machine in the operation of which sanitation is promoted throughout the entire course of molding and packaging the product; one in which the ices are effectually protected against contact with injurious foreign substances; and one which insures the formation of a multiple layer brick having distinct layers of uniform thickness.

Further objects of the invention are to provide a machine whereby a single multiple layer brick or a plurality of individual bricks may be produced at a single operation; one wherein the discharge of a predetermined quantity of material may be effectually controlled; one in which a determined amount discharged will be positively indicated; and one wherein the temperature of the product being handled may be readily varied at will.

Still further objects of the invention are to provide for a uniform discharge of the product forming the several component layers of a brick; to effectually prevent the receptacle overflowing should a surplus amount of the product be discharged thereinto; and to properly control the introduction of material into the containers from auxiliary supply vessels.

In some cases a standard form of box is used which has a standard capacity, such as a quart or a pint, and which, therefore, when filled will contain a given quantity of the product.

Another object of this invention, therefore, is to provide a machine by means of which the filling of such a box can be accomplished and which has provisions whereby the operator may determine when the box is filled.

In most cases the dimensions of standard boxes are unreliable and inaccurate so that the volume thereof will not be up to standard. Accordingly the filling of any given box may, therefore, result in an excessive or diminished quantity varying from the desired standard.

Another object of this invention, therefore, is to provide a machine or apparatus whereby a measured quantity of the semi-frozen product is flowed into the box or package whereby the quantity of the product contained in any box will always be according to standards.

Since the cartons in which ice cream is sold or delivered to the ultimate consumers are usually of a comparatively light weight paper, the discharge of the semi-frozen product into such a package has the effect of bulging the same thereby still further varying the quantity from the desired standard.

Another object of this invention, therefore, is not only to provide means for causing the flow of a predetermined or measured quantity or quantities of the semi-frozen product into the package, but also to properly support the package in order to receive and retain the same.

With these and other objects in view, the invention comprises the novel features of construction and combination of parts more fully hereinafter described.

In the accompanying drawings:

Figure 2 is a side elevation,

Figure 3 is a plan,

Figure 4 is a section on the line 4—4, Figure 3,

Figure 5 is an enlarged detail section of Figure 4,

Figure 6 is an enlarged detail section of Figure 4,

Figure 11:
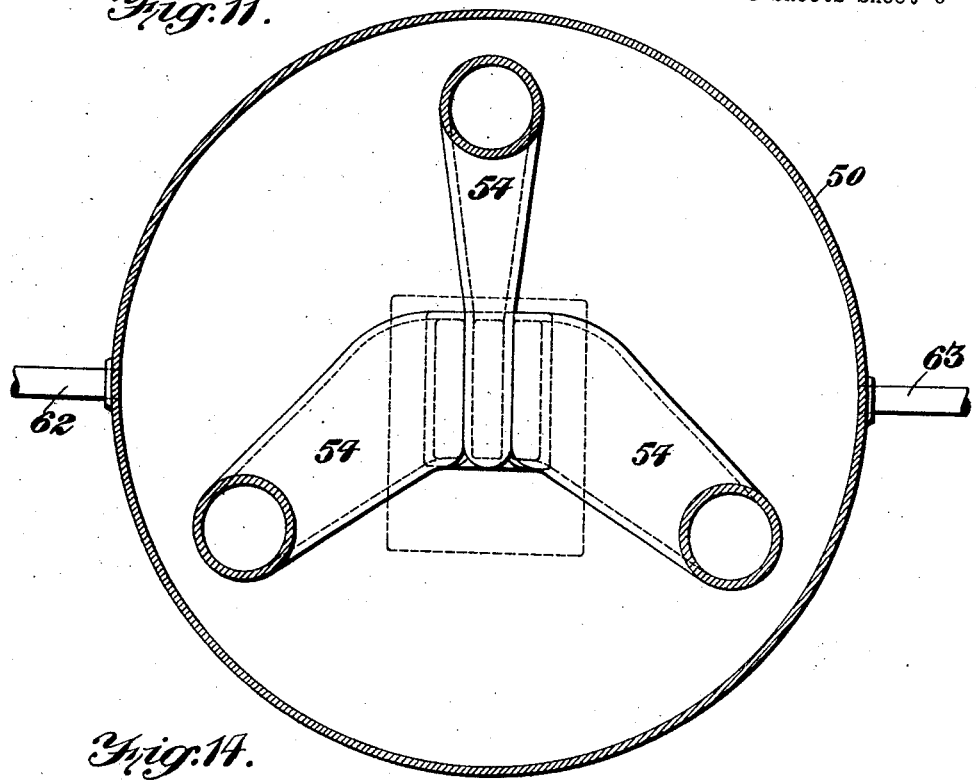
Figure 14:
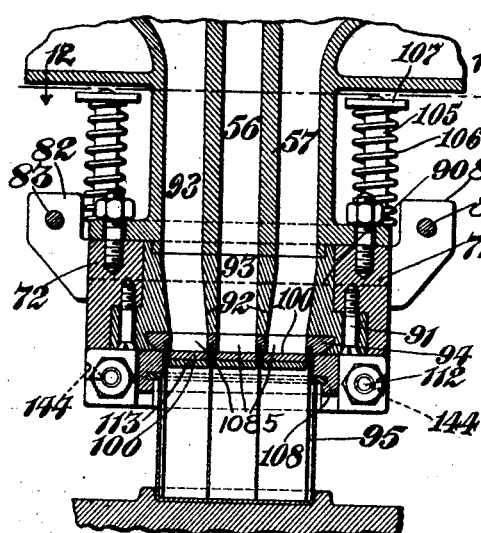
Figure 15:
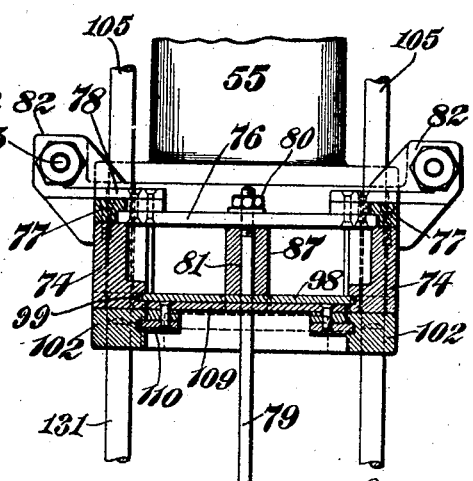

Figure 7 is an enlarged section on the line 7—7, Figure 6, parts being shown in elevation, Figure 8 is an enlarged section on the line 8—8, Figure 6, Figure 9 is an enlarged detail section of Figure 6, Figure 10 is an enlarged detail perspective view of one of the parts, Figure 11 is a section on the line 11—11, Figure 4, Figure 12 is an enlarged detail section of Figure 4, Figure 13 is a detail section on the line 12—12, Figure 14, Figure 14 is a section on the line 14—14, Figure 12, Figure 15 is a section on the line 15—15, Figure 12, Figure 16 is an enlarged detail plan of the table, Figure 17 is a section on the line 17—17, Figure 16, Figure 18 is a section on the line 18—18, Figure 16, Figure 19 is a bottom view of a form showing another embodiment of this invention, Figure 20 is a section on the line 20—20, Figure 19, Figure 21 is a detail section similar to Figure 9, but showing another embodiment of this invention, Figure 22 is a section on the line 22, Figure 21, Figure 23 is an enlarged plan view of Figure 21, Figure 24 is a section on the line 24, Figure 23, Figure 25 is an enlarged perspective view of one of the parts, Figure 26 is a section on the line 26—26, Figure 2, and, Figure 27 is an enlarged detail section of Figure 12.

Referring to the accompanying drawings, 1 designates a base of skeleton construction having bolted thereto four legs 2 which are in turn, bolted to and support a casting 3. Brackets 4 and 5 are mounted on and bolted to this casting, and these brackets, in turn, support, at their upper ends, a bearing 6 for a vertical threaded shaft 7. The upper end of the shaft 7 is provided with a collar 8 bearing against the bearing 6, and the lower end is supported in a recess 9 on the casting, forming a lower thrust bearing.

The shaft 7 has secured to the upper end thereof a bevel gear 10 meshing with a bevel gear 11 on a cross shaft 12 supported in bearings on the bracket 5. A bevel gear 13, secured to the shaft 12, meshes with a bevel gear 14 on a vertical shaft 15 mounted in bearings on the bracket 5 and one of the legs 2. A bevel gear 16, on the shaft 15, meshes with a bevel gear 17 on a shaft 18 supported in bearings 19 on a table 20 bolted to the legs 2. The shaft 18 has mounted thereon a hand wheel 21 having a handle 22 thereon. This handle has a collar 23 screwed thereon so as to slide on a sleeve 24 secured to the hand wheel. A spring 25 on the sleeve 24 bears, at one end, against the head 26 of the sleeve, and, at its other end, against the collar 23. A pin 27 on the handle 22 passes through the rim of the hand wheel and projects slightly beyond the same, and this projecting part is adapted to engage a stop 28 on one of the legs 2. Rotation of the hand wheel will cause a rotation of the shaft 7, and this hand wheel is arrested by the engagement of the pin 27 with the stop 28. By pulling on the handle 22, the pin 27 may be withdrawn out of the path of the stop 28, so as to permit further rotation of the handwheel.

The casting 3 is cored to form a series (in this case three) of containers 32 having reduced discharge necks 33, and the coring of this casting forms a water jacket surrounding these containers. The containers are lined with liners 34, of German silver, macadamite, or any other suitable non-corrosive material, and the liner has a neck 35 entering the neck 33. Pistons 36, of non-corroding material, are mounted to slide in the liners or cylinders 34, and these pistons are provided with piston rings 37. The piston rods 38 are mounted in a cross head 39 and secured in adjusted position therein by means of set screws 40. The cross head has a thread engaging the threaded shaft 7, and this cross head is supported against rotation by a lug 41 thereon engaging a vertical bar 42, threaded, at its lower end, into the casting 3, and secured, at its upper end, in the bracket 4. The piston 36 is provided with an inwardly opening valve 43 closed by a light spring, and having a projecting head 44 whereby it may be opened manually. A valve plate 45 is mounted on a shaft 46 extending through the casting 3, and having, at its lower end, a handle 47 whereby it may be turned. By movement of the handle 47, the plate 45 may be moved to open and close the lower end of the container. By rotating the threaded shaft 7, through the medium of the hand wheel 21, the cross head, with its pistons 36, may be moved up and down. During the downward movement of the pistons, the valves 43 will be closed, while, when the pistons move upwardly, the valves will automatically open by atmospheric pressure inwardly.

A hollow casting 50 is provided with a series (in this case three) of necks 51, having flanges 52 whereby they may be bolted to the casting 3, and having machined nipples 53 entering the necks 33. The necks 51 open into conduits or receivers 54 which join to form a neck 55 having a series of oblong chambers 56 separated by partitions 57. The neck 55 has an attaching flange 58. The inside of the necks 51 and 55, and the conduits 54, are tinned or galvanized to form a non-corrosive lining, but this lining may be formed of lead placed therein in pipe form, and expanded, to conform to the interior surfaces, by hydraulic pressure. In both cases, the ends of the necks 51 and 55 are also galvanized, and a gasket may be placed between the nipples 53 and the nipples 35 of the liners 34.

The jacket of the casting 3 has an inlet 60 and an outlet 61, while the jacket of the casting 50 has an inlet 62 and an outlet 63. A pipe 64, connected to a brine supply, or any other suitable freezing medium, and a pipe 65, connected to a warm water supply, have connections with the pipes 60 and 62, and a pipe 66 connects the pipes 60 and 62. Valves 67, 68 and 69 are placed in the pipes. By closing the valve 68, brine may be circulated through the jacket of the casting 3 and warm water through the jacket of the casting 50. Brine may, however, be circulated through the jacket 50, by closing the valve 69 and opening the valve 68. Similarly, the jacket in casting 3 may be connected to the warm water supply, when desired, by closing the valve 67 and by opening the valves 68 and 69.

A skeleton frame 72, as seen more clearly in Figures 12 and 13, is secured to the flange 58 by means of bolts 73, and this frame has laterally extending side members 74 connected by a cross member 75. A cross head 76 is guided by gibs 77 on the side members 74, and has parts 78 extending from these gibs. A shank 79 is bolted to the cross head at 80 and extends through a slot 81 in the central member 87 of the frame 72. The parts 78 have formed thereon, ears 82 receiving forwardly extending rods 83 adjustably secured therein by nuts 84. These rods 83 extend through guides 85 on the frame 72 and are connected, at their forward ends, by a cross bar 86.

A liner 90 of non-corroding metal is secured in the frame 72 by screws 91, and is provided with partitions 92 alining with partitions 57 forming conduits 93, which are continuations of the conduits 56. This liner 90 receives a slide 94 having a series of plates 95 set therein. These plates 95 are formed of a non-corrosive metal, and these plates are set into the slide 94 and secured in position in any suitable manner, such as being driven into position, or by casting the slide 94 on these plates. The slide 94, carrying the plates 95, forms a form and may be removed from the frame 72 and the liner 90 by a forward sliding movement. It is held in position by means of a screw 96 extending through the end of the slide and into the flange 97 of the frame, as shown in Figures 12 and 27. A slide 98 is mounted in guide ways 99 in the side members 74, and this slide is slit at its front end to take over the shank 79, and is slit longitudinally from its rear end through a part of its length to provide tongues 100 between the plates 95 of the form. The front end of these tongues are arranged to abut against a shoulder 101 on the base plate 94 of the form.

A skeleton frame 102, having cross members 103 and 104, is mounted on shanks 105 extending through the frame 72. Each shank has a spring 106 bearing, at one end, against a head 107 on the shank, and, at the other end, against the frame. These springs, therefore, operate to normally hold the frame 102 in raised position against the under face of the frame 72 to permit the frame 102 to be moved downwardly. The end of the frame 103 has secured thereto, by bolts 112, a rectangular frame 108 of non-corrodible metal, so as to form, in effect, a continuation of the frame 103. A slide 109 has plates 110 moving in guide ways in the frame 102, and this slide is slit to form tongues 113 entering between the plates 95. Both slides 98 and 109 are apertured to receive the shank 79. The inside of the frame 108 is provided with a gasket 111 engaged by the ice cream receptacle A.

The rectangular frame 108 has passages 1085 forming continuations of the conduits 54 and providing a series of ports connecting with the cylinders 34 forming the sources of semi-frozen ice cream supply. These ports are arranged side by side in assembling relation to discharge within the form provided by the blades 95. These ports are controlled by the slides 98 and 113 which provide valves adapted to open and close the ports.

Figure 1:
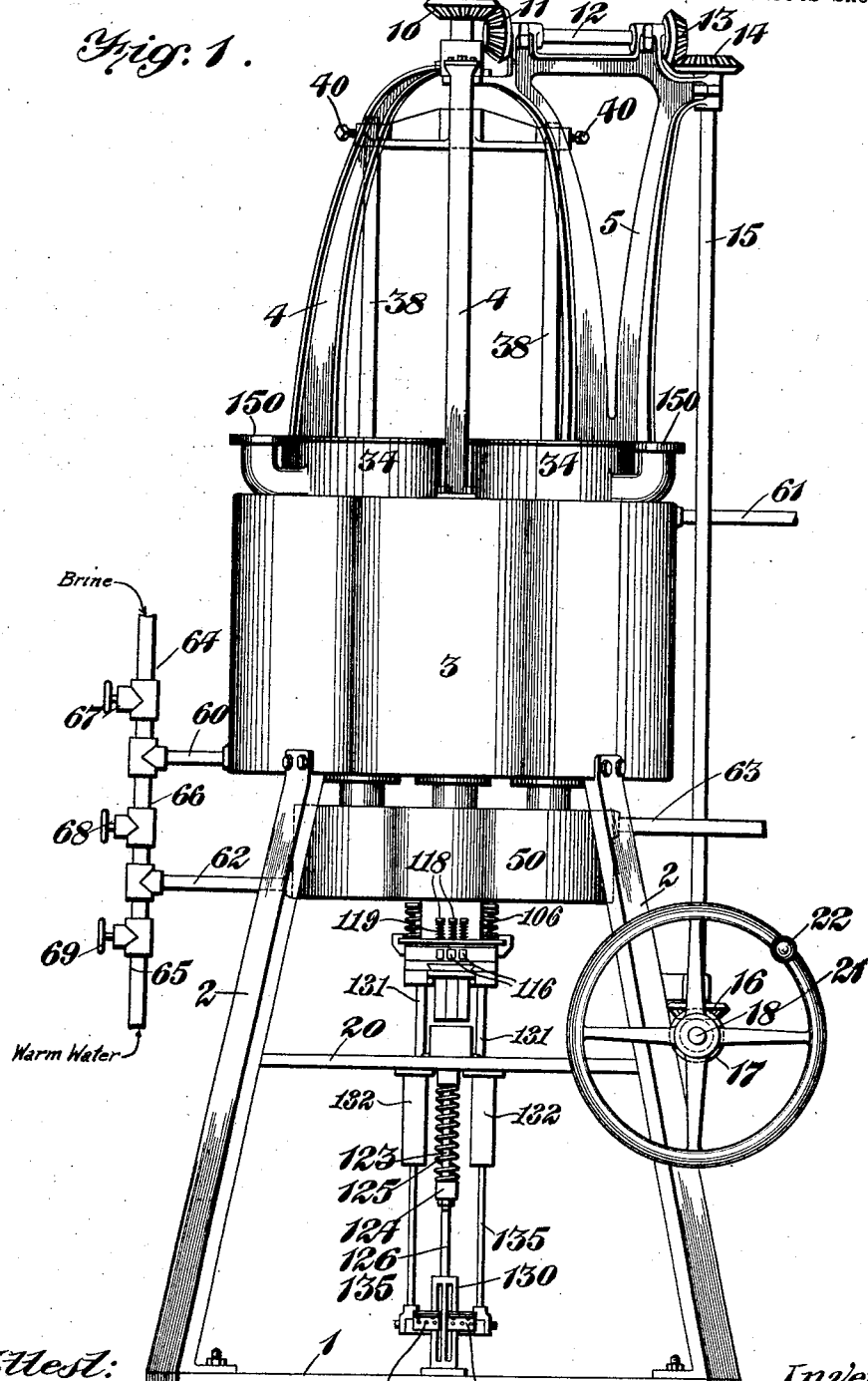
Figure 1 is a front elevation of a machine embodying this invention.

The lining 90 is bored at points opposite the conduits 93, as shown at 114, to receive glass tubes 115 abutting, at their lower ends, against the shoulders formed by enlarging the bores 114, and, at their upper ends, against the flange 58. The lining 90 and the frame 72 are cut away opposite the tubes 115 to form windows 116 so that these tubes are visible from the front of the machine, as shown in Figure 1. The tubes each receive a plunger 117, each having a shank passing through the flange 58 and provided with a head 118. A spring 119 on the shank, abutting, at one end, against the head, and, at the other end, against the flange, operates to hold the plunger in raised position. It will thus be seen that, when the slides 98 and 109 are withdrawn, the bores 114 and the tubes 115 will be in communication with the spaces formed in the form between the plates 95.

It will be noted that the plates 95 are mounted on a base plate 94, and that the form is endwise removable by removing the screw 96. This form can, therefore, be removed and other forms substituted. Thus, as shown in Figures 19 and 20, the base 940 may be provided with a series of plates 950 so as to form a series of subdivisions longitudinally of the form. In this case, the frame 1080 is provided with a series of cross pieces 1111, and the gasket 1110 is provided both for the cross pieces and for the contour of the frame. The subdivided form is thus adapted to receive a series (in this case three) of boxes B thereover, the upper edges of these boxes abutting against the gasket 1110 as in the other construction. It will be noted that the frames 108 and 1080 are removably secured to the frame 102 by means of the screws 112. The machine can, therefore, be changed at will by simply removing the form 94 and the frame 108, and inserting in its place another form 940 and another frame 1080.

In this embodiment the ports connecting with the sources of ice cream supply discharge into the forms receiving the series of packages, and the cross-members 1101 divide these ports into a series of sets of ports 1086, the ports of each set connecting with said sources. Accordingly the semifrozen product is flowed from said sources into the series of packages.

The table 20 is recessed to receive a support 120 provided with a pair of flaring side ribs or projections 121 and an end rib or projection 122, forming, together, means for positioning the box or receptacle A in position thereon. This support is mounted on a pair of vertical rods 123 extending through and guided by bosses on the table 20, and mounted, at their lower ends, in a cross head 124. Springs 125 on the rods 123 bear against the cross head and the table 20 and operate to hold the support 120 in lowered position. A link 126 and an angular brace 127 connect the cross head 124 with one end of a treadle 128 pivoted intermediate its ends, on a bracket 129 and engaging a guide bracket 130. Depression of the treadle 128 will raise the support 120 vertically against the tension of its springs 125, and release of the treadle will cause these springs to return the support.

A pair of vertical bars 131, as seen in Figures 1 and 17, connected, at their upper ends, to the frame 102, extend through the table 20 and through spring casings 132 secured to the under side of the table. A spring 133 is mounted in each of the casings 132 on the bar 131, and bears, at one end, against a collar 134 on the bar, and, at the other end, against the end of the casing 132. A rod 135, tapped into the bar 131, is connected, at its lower end, to a treadle 136 pivoted, at its end, on a bracket 137 and guided, at its end, by the bracket 130. The springs 133 cooperate with the springs 106 to hold the frame 102 in raised position against the under face of the frame 72, and the frame 102 can be depressed upon depression of the treadle 136.

The support 120 is provided with a pair of hooked levers 138 pivoted at 139 and having each an arm 140 provided with a lug 141 extending through an aperture in the support. A spring 142 operates to move the arms 140 downwardly and the hooks 143 inwardly. The hooks 143 are adapted to engage undercut shoulders 144 (Figure 14) cut in the side members of the frame 102.

If the treadle 128 be depressed so as to raise the support 120 and move the box A thereon over the form, the hooks 143 will snap into engagement with the shoulders 144. The combined tensions of the springs 133 and 106 is greater than that of the springs 125, so that these springs will operate to hold the frame 102 and the support 120, latched thereon, in raised position with the box A over the form. If the treadle 136 is now depressed, the frame 102 is moved down, thereby permitting the springs 125 to move the support 120 and the box A thereon downwardly off of the form. As the support approaches its lower position, the lugs 141 will engage the table 20 and force the levers 138 outwardly so as to release the hooks 143 from the frame 102, thereby permitting the support 120 to drop a short distance in its seat on the table 120.

The liners or cylinders 34 are each provided with a laterally extending neck 150 for filling purposes. A closure is provided for closing the opening between the neck and the cylinder. Referring to Figures 4, 6, 7, 8, 9 and 10, this closure comprises a slide 151 dove-tailed into the cylinder so as to slide vertically. A pair of brackets 152, mounted on the slide, have pivoted therebetween a locking member 153. This locking member has a sector shaped rib 154 projecting through a slot in the slide and into a vertical slot 1540 cut in the cylinder. The rib 154 has a downwardly projecting lug 155 adapted to work in the slot 1540. The end of the locking member is bifurcated, as shown at 156, to engage a stirrup 157 on the piston 36. The lower end 158 of the slide 151 is adapted to cooperate with the seat 159 in the cylinder.

When the piston is raised slightly above the position shown in the drawings, the engagement of the stirrup 157 with the member 153 will cause the slide 151 to be raised, the member 153 being held against pivotal movement by the engagement of the lug 155 with the slide and the walls of the recess 1540. The piston, being above the opening of the neck 150, and the slide being raised, the cylinder can now be filled through the neck. When the piston descends, it will carry the slide with it until the end 158 of the slide abuts against the seat 159. At this time, the lug 155 will be below the edge 160 of the neck, thereby permitting the member 153 to rotate in a counter clock-wise direction, Figures 6 and 9, so as to permit the forked end 156 to move downwardly and out of engagement with the stirrup 157. The slide is thus disconnected from the piston, permitting the piston to proceed downwardly, while the slide closes the opening between the neck and the cylinder. As the forked end 156 moves out of engagement with the stirrup, the movement of the lug 155 underneath the edge 160 causes a cam action which firmly seats the end 158 of the slide on its seat 159. After the piston has performed its stroke, and if it is again raised, the stirrup will automatically engage the fork 156 and first rotate the member 153 so as to cause the lug 155 to position itself parallel with the slide, thereby stopping the rotation of the member 153, and the piston will then carry the slide with it as hereinbefore described.

Figures 21 to 25 inclusive show another embodiment of this invention. In this construction, the slide 151 has formed thereon or attached thereto a pair of spaced lugs 163 which pivotally support an operating member 164 therebetween. This operating member is pivoted at 165 on a bolt provided with a nut, so that the member 164 can be frictionally clamped between the lugs. The member 164 has a forked end 166 adapted to engage a stirrup 167 on the piston 36. The member 164 has a beveled recess 168 adapted to be engaged by a pin 169 slidingly mounted in one of the lugs 163 and pressed inwardly by a leaf spring 170 which is mounted on the lug 163. The pin 169 is provided with a knurled head 171 whereby this pin may be manually moved out of engagement with the recess 168. A beveled recess 172 in the member 164 is engaged by a sliding pin 173 in the other lug 163, and this pin is also moved inwardly by a leaf spring 174 mounted on the lug. The pin is bent downwardly, as shown at 175, so as to be engaged by a wedge shaped cam member 176 on the cylinder 34. The pin 173 is notched, as shown in Figure 24, to receive the bifurcated end of the leaf spring, and this prevents the pin from turning.

As the piston moves downwardly, it will carry the slide 151 with it, due to the engagement of the pin 173 with the recess 172 in the member 164. As the end of the slide nears its seat, the arm 175 will be engaged by the cam 176 so as to move the pin 173 out of engagement with the recess 172 and permit the member 164 to rotate in the lugs 163 in order to disengage this member from the stirrup 167. The piston can, therefore, move downwardly to complete its stroke, while the slide closes the opening between the neck and the cylinder. As the piston moves upwardly, the stirrup 167 will move automatically into engagement with the forked end 166 of the member 164, so as to first rotate this member until the shoulder of the recess 168 engages the pin 169, and the slide will then be raised to open the neck to the cylinder. As the arm 175 leaves the cam, the pin 173 will automatically snap into the recess 172, which is now again opposite the pin, so as to restore the parts to original position. If it is desired to raise the piston completely out of the cylinder, the pin 169 can be moved outwardly by its head 171 so as to permit the member 164 to swing upwardly out of engagement with the stirrup.

The pins 169 and 173 may be omitted and the frictional clamping engagement of the bolt 165 relied upon to operate the slide. Thus, as the piston moves downwardly, the slide will move with it until the end 158 of the slide engages the seat 159. Further downward movement of the piston will now cause the member 164 to rotate in the lugs 163 until disconnected from the stirrup 167. The piston will again upon its return movement engage the forked end 166 of the member 164 as it moves upwardly to again shift and open the slide. This frictional engagement is also useful in connection with the latch pins 169 and 173, as it causes a firm seating of the slide on its seat 159. The cylinders may be filled in any suitable manner, through the necks 150, through the medium of a funnel or otherwise. The ice cream can, however, be supplied in auxiliary supply cans which can be inverted over the necks so as to furnish an auxiliary supply. This construction is shown in Figures 4 and 5. The neck 150 is provided with a vertical shaft 180, which has a bearing in a boss, so as to slide vertically. This shaft has an operating and latching lever 182 pivoted thereto at 183, so as to swing outwardly, and this lever is provided with a lug 184 adapted to engage a lug 185 on the casting 3. The can 186, having a funnel shaped removable top 187, is provided with a neck 188 adapted to enter the neck 150. A closure 189 has a shank 190 mounted in a bearing 191 in the neck, and this shank has mounted thereon a spring 192 bearing, at one end, against the bearing 191, and, at its other end, against a head 193. This spring normally operates to hold the closure closed.

The can 186 is inverted over the neck 150, as shown in Figures 4 and 5, at which time the shaft 180 is moved downwardly so that the end 194 is stopped by the lug 185. If the shaft 180 is now moved upwardly so as to engage the shank 190, the closure 189 will be opened, as shown in Figures 4 and 5, and this closure can be held open by the latching engagement of the lug 184 with the lug 185. The contents of the can will now flow into the cylinder, but the supply may be interrupted at any time by moving the arm 182 outwardly, which will cause the closure to move to closed position.

The operation of this machine is as follows:

The ice cream, in a semi-frozen condition, is discharged into the cylinders or containers while the pistons are raised. At this time, the plates 45 move to open position, while the cut-off slides 98 and 109 are closed so as to close the lower ends of the conduits connecting the containers with the form. Brine, at a temperature between 35 degrees and 40 degrees Fahrenheit, is now circulated through the jacket in the casting 3, while water of a higher temperature, that is, between 50 and 60 degrees Fahrenheit, is admitted to the water jacket in the casting 50. Due to the large volume of the water jacket in the casting 50, and due to the fact that the form has a metallic connection with this jacket, the temperature of the form will be maintained at about the same uniform temperature as that of the water in the jacket.

A box A is now placed on the support 120, and this support raised by the depression of the treadle 128 so as to move the box from the form and latch the support in raised position. The operator will now move the cross bar 86 rearwardly, or to the right, Figure 4, so as to move the slides back and open the form to the conduits 54. The hand wheel 21 is now turned, thereby causing the pistons to descend and force the ice cream from the containers and through the conduits into the form to fill the box A. As soon as the box is filled, the surplus ice cream will rise in the tubes 115, and this will notify the operator when the box is filled. Preferably, however, the gearing is so proportioned that one complete turn of the hand wheel will fill the box, and the engagement of the pin 27 with the stop 28 will, therefore, automatically stop the hand wheel in proper position at the completion of the filling of the box. After the box is filled, the operator will pull forwardly on the cross bar 86 so as to close both slides and cut off the conduits as well as the tubes 115 from the form. The operator will now depress the treadle 136, causing the box support 120, as well as the frame, together with its cut-off slide 109, to move downwardly together so as to strip the box from the form and scrape the ice cream from the plates 95, to which it may adhere. As soon as the support 120 nears the table 20, the latches will be automatically disconnected from the frame 102 permitting the support 120, with the box thereon, to drop the short distance on the table 20, and, upon release of the treadle 136, the frame 102, together with its cut-off slide 109, will return to original position. The box with the ice cream therein can now be removed from the support.

The operation is the same when a series of boxes B are used in connection with the multiple unit form shown in Figures 19 and 20. In this case the three boxes are shoved in place together on the support 120 between the ribs 121, and the form will enter the boxes as shown in Figure 20. These boxes are filled simultaneously and cut off simultaneously in the same manner as in the single unit construction.

When the next box is in position, and when the slides are opened, the operator will first depress the plungers 117 so as to discharge the contents of the tubes 115 into the boxes, these plungers being returned to original position by their springs. These tubes also perform a useful function in that they compensate for irregularities in the different cylinders. Thus, if the piston in one cylinder should be slightly in advance of the others, the excess ice cream will be forced into the corresponding tube 115, while the filling of the box will be uniform. As a matter of fact, however, any irregularities in the relation of the pistons will be equalized after the first box has been filled.

It will be noted that the ice cream is placed in separate containers, and that these separate containers discharge into separate conduits which join together but remain separated at their ends, where they discharge to the form. The plates 95 of the form are continuations of the walls of the conduits so that a series of separate spaces or chambers (in this case three) are formed in the box, which separate spaces or chambers are continuations of the separate conduits connected with the containers. The ice cream will, therefore, be discharged into the box, from each container into a separate compartment in the box. If, therefore, each container contains ice cream of a different color or flavor, the ice cream, as discharged into the box, will consist of a plurality of layers separated by the partitions. When the box is withdrawn from the form, the ice cream, being in a semi-frozen condition, will not mix, but the contents of the box will form together a brick containing a series of separate layers of different flavors or colors. The brick, as discharged from the form in the box, is now placed in a refrigerator and chilled to the desired hardness; this hardening is, however, performed in the carton. Since the ice cream is discharged directly into the box in which it is afterwards sold, this box can be lined with a suitable lining, and the ice cream need not, therefore, be removed from the box until used by the ultimate consumer.

It will be noted, from an inspection of Figures 20 and 27, that there is a small space between the lower face of the slide 109 and the top of the box. The box will, therefore, be filled heaped full. This extra space is provided for the purposes of compensating for the thickness of the plates 95 as well as to provide for a settling, so that the box will have a full quantity of ice cream in it.

After the contents of the cylinders have been discharged, the plungers are raised, and during the upward movement of the plungers, the valves 43 automatically open to let in the air. Prior to raising the plungers, it is also advisable to close the plates 45 so as to keep the quantities in the conduits uniform. When the plungers are raised sufficiently to cause the slides 151 to open the necks 150 to the cylinders, these cylinders can be filled by operating the handles 182.

In accordance with this invention, therefore, a measured quantity of the semi-frozen product is flowed into the package so as to form therein a mass of a standard volume or weight. This is accomplished as heretofore described by so proportioning the gearing, connecting the hand wheel with the pistons in the cylinders, with respect to the proportions of the cylinder, that one complete turn of the hand wheel operates to discharge a predetermined quantity of the product into the box, and in case of multi-layer bricks, a predetermined quantity of each flavor. It is, therefore, positively insured that there will be deposited in the receptacle a predetermined and measured quantity of the semi-frozen ice cream, and in case of multi-layer bricks, a predetermined and measured quantity of each flavor.

As previously explained a box is used which has a lining. Such a box is disclosed in applicant's Patent No. 1,180,188 patented April 18, 1916. In accordance with this invention, therefore, a lined box is sustained in cooperative relation with respect to the port or ports, so as to sustain the package lining with respect to the ports, and a measured quantity or quantities of the semi-frozen product is or are flowed into the sustained lining. Accordingly the package will be complete with the product inside of the lining thereof.

In accordance with this invention the semi-frozen product is contained in a large container or tank, and in case of multi-layer bricks, in corresponding large containers or tanks, and this tank or tanks is or are suitably constructed to maintain the product in the proper semi-frozen condition, which in the illustrative apparatus heretofore described, is accomplished by jacketing the container or containers. There is thus provided a large body or bodies of the semi-frozen product, from which the product is flowed directly into the package, and this body or bodies is or are large compared to the size of the package. Accordingly the provision of such a large body or bodies will not only secure uniformity of the product, in consistency and composition, but it assures that the product will have the proper viscosity, and moreover eliminates melting or deterioration of the product before as well as after it enters the package.

In depositing a predetermined or measured quantity of the semi-frozen product in the box, the flow is preferably under pressure, as from the nature of the product the flow is not only tardy but the product has a tendency to stick to the metal conduits through which it passes; this is especially true where the refrigeration of a semi-frozen product has been carried out considerably, it being noted that it is desirable that even the semi-frozen product be refrigerated as much as possible. It has, however, been found that with the low pressures required to secure the desired result, there is really no detrimental effect on the product nor any appreciable loss in yield. By, however, flowing the product into the box under pressure, not only is it possible to secure a measured brick, and not only is wastage prevented, but it is possible to flow a product of heavy viscosity, and this is the condition that will produce the best ice cream—a product free from large water crystals and, therefore, smooth to the taste.

The flowing of a measured quantity of a semi-frozen product into the box as distinguished from filling the box to the rim, not only is important for the reason that it secures a brick of definite weight and bulk, but also has an additional advantage. If it is attempted in the practical operation of a machine of this kind to fill a box to the rim, then where a pressure flow is employed there is liable to be compression to some extent unless the operator is notified when the box is filled. However, by flowing a predetermined measured quantity of the semi-frozen product into the box, this quantity can always be kept below the full capacity of the box so that there is in such case no liability that detrimental pressures will be employed.

Furthermore since predetermined or measured quantities of the several flavors are flowed into a given carton, not only will the proper amount of each flavor be deposited to form a multi-layer brick, but mixing of the flavors will be practically avoided.

It will be noted that the carton is supported at its bottom on the flat table 20 and laterally at its ends by the ribs 121 and 122. The box is, therefore, braced against bulging; while the sides and ends of the frame 108 and the gasket 111 act as additional sustaining means even apart from the plates 95. The somewhat frail carton is, therefore, properly supported and sustained to receive and retain the predetermined or measured quantity or quantities of the semi-frozen product flowed therein.

It is to be particularly observed that, in the operation of the machine, the ice cream is, owing to the parts with which it comes into contact being either composed of aluminum or plated with a non-corrosive material, prevented from coming into contact with any material which might injuriously affect its flavor; that, owing to the material being introduced into the containers from supplemental vessels and finally discharged directly into the cartons in which it is to be sold, thorough sanitation in handling the cream is maintained, and, further, that the material of the several layers of a multiple layer brick is delivered in uniform quantities to the brick molding form, or the receptacle. In this connection it may be mentioned that in instances where the multiple layer bricks are composed of one or more layers of cream, and a layer of water ice, the cream, being heavier, tends to force the water ice out of the form. The machine of this invention provides for overcoming this difficulty, because of the plungers operating in the containers being made independently adjustable, and further by the provision of the gage tubes, which may receive from the form a surplus amount of material to be again delivered into the form at the beginning of molding the next succeeding brick, it being evident that, where water ice is to be combined with the cream, the appropriate plunger may be set in advance of the others, thus to discharge the water ice under a relatively increased pressure, and that this supply of an additional amount of material to one of the layers may be further carried out by discharging the surplus material taken up by the appropriate indicating tube back into the form, thus providing for increasing the amount of material in any one of the layers at will. It is also to be noted that the present machine effectually provides not only for regulating and positively controlling the amount of material delivered to the form as a whole, but to the several compartments of said form, and for visually indicating to the operator the fact that the determined amount for filling the form has been discharged thereinto.

Attention is also called to the fact that, under the method involved in thus handling the ice cream or other ices, the material is delivered in semi-frozen condition directly into the carton in which it is to be sold, and thereafter completing the freezing process. The advantages incident to this method of packaging cream, aside from the above described sanitary methods of handling the material, are the production of bricks of uniform size, and composite layers of uniform thickness, and the obtainance of bricks in which the desirable velvety condition of the cream is preserved.

It will be noted that the closures 45 (Figures 4 and 6) at the bottoms of the containers are arranged to prevent the flow of the product therefrom. Furthermore each container or receiver 32—34 is provided with an inlet seat 150, while each can or container 186 (Figures 4 and 5) has an outlet 188 adapted for operative connection with the receiver seat in order to be sustained thereby and supply the product thereto.

It is obvious that various changes may be made in the details of construction, without departing from the spirit of this invention. It is, therefore, to be understood that this invention is not to be limited to the specific construction shown and described.

Having thus described the invention what is claimed is:

1. A machine of the class described comprising a plurality of ice cream containers, means for discharging the cream therefrom in assembled layers, means for relatively regulating the discharge from said containers, and means controlling as a whole the discharge of a predetermined amount of cream.

2. A machine of the class described comprising a multiple form, means for delivering ice cream thereto, means for relatively regulating the amounts delivered to the units of said form, and means for controlling as a whole the delivery of a predetermined amount of cream to said form.

3. A machine of the class described comprising a multiple form, means for delivering ice cream thereto, means for relatively regulating the amounts delivered to the units of said form, means for controlling as a whole the delivery of a predetermined amount of cream to said form and means for discharging the contents of said forms.

4. A machine of the class described comprising a multiple form, means for delivering ice cream to the units of said form, means for positioning a receptacle, on the latter, means for relatively regulating the amounts delivered to said units, and means for controlling as a whole the delivery of a predetermined amount of cream to the form.

5. A machine of the class described comprising a multiple form, means for delivering cream to the units of said form, means for positioning a receptacle, on the latter, means for relatively regulating the amounts delivered to said units, means for controlling as a whole, the delivery of a predetermined amount of cream to the form, and means for discharging the contents of the form into said receptacle.

6. A machine of the class described comprising a form, means for delivering ice cream thereto, and means for indicating the delivering of a determined amount of cream to the form.

7. A machine of the class described comprising a form, means for delivering ice cream thereto, means for indicating the delivering of a determined amount of cream to the form, and means for positioning a box, on the form.

8. A machine of the class described comprising a form, means for delivering ice cream thereto, means for indicating the delivering of a determined amount of cream to the form, means for positioning a box on the form, and means for discharging the contents of the form into the box.

9. A machine of the class described comprising a multiple form, means for delivering ice cream thereto, and means for indicating the delivery of determined amounts of cream to the several units of said form.

10. A machine of the class described comprising a multiple form, means for delivering ice cream thereto, means for indicating the delivery of determined amounts of cream to the several units of said form, and means for positioning a box, on the form.

11. A machine of the class described comprising a multiple form, means for delivering ice cream thereto, means for indicating the delivery of determined amounts of cream to the several units of said form, means for positioning a box, on the form, and means for discharging the contents of the form into the box.

12. A machine of the class described comprising a form, means for delivering ice cream thereto, and means adapted to receive the surplus of an excessive amount delivered to the form.

13. A machine of the class described comprising a form, means for delivering ice cream thereto, and means adapted to receive the surplus of an excessive amount delivered to the form and redischarge said surplus to the form.

14. A machine of the class described comprising a multiple form, means for delivering ice cream thereto, and means adapted to receive the surplus of excessive amounts delivered to the units of the form.

15. A machine of the class described comprising a multiple form, means for delivering ice cream thereto, and means adapted to receive the surplus of excessive amounts delivered to the units of the form and redischarge them into the form.

16. A machine of the class described comprising a form, means for delivering ice cream thereto, and an indicating tube constructed and arranged to show the delivery of a determined amount of cream to the form.

17. A machine of the class described comprising a form, means for delivering ice cream thereto, and an indicating tube communicating with the form and adapted to receive the surplus in excess of a determined amount of cream delivered to the form.

18. A machine of the class described comprising a multiple form, means for delivering ice cream thereto, and a plurality of indicating tubes communicating respectively with the several units of the form and adapted to receive the surplus in excess of determined amounts delivered to said units.

19. A machine of the class described comprising a multiple form consisting of a removable slide and division plates carried thereby, and means for delivering ice cream to said form.

20. In a machine of the class described the combination with a series of sources of supply of semi-frozen ice cream, of forming means adapted to receive a receptacle, conducting means between said sources and said forming means, adapted to deliver the semi-frozen ice cream from said sources and in assembled relation into the receptacle, and means for positively insuring the deposit into the receptacle of a predetermined and measured quantity of the semi-frozen ice cream.

21. In a machine of the class described, the combination with a series of sources of supply of semi-frozen ice cream, of forming means adapted to receive a receptacle, conducting means between said sources and said forming means, adapted to deliver the semi-frozen ice-cream from said sources and in assembled relation into the receptacle, and means for positively insuring the deposit into the receptacle of predetermined and measured layers of the semi-frozen ice cream.

22. In apparatus for packaging ice cream in a semi-frozen condition in cartons for hardening therein and for delivery to the ultimate consumers, the combination with a container adapted to provide a source for and maintain the product in proper semi-frozen condition, of a port operatively connecting therewith, means for positioning a carton for cooperation with said port and for sustaining the carton against distortion while being filled, and means adapted for causing the flow of a predetermined quantity of the semi-frozen product through said port and into the carton so positioned and sustained.

23. In an apparatus for packaging ice cream in a semi-frozen condition in cartons for hardening therein and for delivery to the ultimate consumers, the combination with a container adapted to provide a source for and maintain the product in proper semi-frozen condition, of a port operatively connecting therewith, means for positioning a carton for cooperation with said port and for sustaining the carton against bulging while being filled, and means for causing the flow of the semi-frozen product through said port and into the carton so positioned and sustained.

24. In an apparatus for packaging ice cream in a semi-frozen condition in cartons for hardening therein and for delivery to the ultimate consumers, the combination with a container adapted to provide a source for and maintain the product in proper semi-frozen condition, of a port operatively connecting therewith, means for positioning a carton for cooperation with said port and for sustaining the carton against bulging while being filled, and means for forcing the semi-frozen product through said port and into the carton so positioned and sustained.

25. In an apparatus for packaging ice cream in a semi-frozen condition in cartons for hardening therein and for delivery to the ultimate consumers, the combination with a container adapted to provide a source for and maintain the product in proper semi-frozen condition, of a port operatively connecting therewith, means for positioning a carton for cooperation with said port and for sustaining the carton against bulging while being filled, means for forcing the semi-frozen product through said port and into the carton so positioned and sustained, and a valve adapted to open and close said port.

26. In an apparatus for packaging ice cream in a semi-frozen condition in cartons for hardening therein and for delivery to the ultimate consumers, the combination with a series of containers adapted to provide sources for and maintain the product in proper semi-frozen condition, of a series of ports operatively connecting with the respective containers, means for positioning a carton for cooperation with said ports and for sustaining the carton while being filled, and means adapted for causing the flow of predetermined quantities of the semi-frozen product through said ports and into the carton so positioned and sustained.

27. In an apparatus for packaging ice cream in a semi-frozen condition in cartons for hardening therein and for delivery to the ultimate consumers, the combination with a series of containers adapted to provide the sources for and maintain the product in proper semi-frozen condition, of a series of ports operatively connecting with the respective containers, means for positioning a carton for cooperation with said ports and for sustaining the carton against bulging while being filled, and means for causing the flow of the semi-frozen product through said ports and into the cartons so positioned and sustained.

28. In an apparatus for packaging ice cream in a semi-frozen condition in cartons for hardening therein and for delivery to the ultimate consumers, the combination with a series of containers adapted to provide sources for and maintain the product in proper semi-frozen condition, of a series of ports operatively connecting with the respective containers, means for positioning a carton for cooperation with said ports and for sustaining the carton against bulging while being filled, and means for forcing the semi-frozen product through said ports and into the carton so positioned and sustained.

29. In an apparatus for packaging ice cream in a semi-frozen condition in cartons for hardening therein and for delivery to the ultimate consumers, the combination with a series of containers adapted to provide sources for and maintain the product in proper semi-frozen condition, of a series of ports operatively connecting with the respective containers, means for positioning a carton for cooperation with said ports and for sustaining the carton against bulging while being filled, means for causing the flow of the semi-frozen product through said ports and into the cartons so positioned and sustained, and valves adapted to open and close said ports.

30. In an apparatus for packaging ice cream for delivery to the ultimate consumers, the combination with a series of sources of supply of the semi-frozen product, of means adapted for causing the flow of predetermined quantities of the semi-frozen product from said sources and into the package.

31. In an apparatus for packaging ice cream for delivery to the ultimate consumers, the combination with a series of sources of supply of the semi-frozen product, of ports operatively connecting with the respective sources, and means adapted for causing the flow of predetermined quantities of the semi-frozen product through said ports and into the package.

32. In an apparatus for packaging ice cream for delivery to the ultimate consumers, the combination with a series of sources of supply of the semi-frozen product, of ports operatively connecting with the respective sources, means adapted for causing the flow of predetermined quantities of the semi-frozen product through said ports and into the package, and valve means adapted to open and close said ports.

33. In an apparatus for packaging ice cream for delivery to the ultimate consumers, the combination with a series of sources of supply of the semi-frozen product, of ports arranged in assembling relation and operatively connecting with the respective sources, and means adapted for causing the flow of predetermined quantities of the semi-frozen product through said ports and into the package.

34. In an apparatus for packaging ice cream for delivery to the ultimate consumers, the combination with a series of sources of supply of the semi-frozen product, of means for holding a package, and means adapted for causing the flow of predetermined quantities of the semi-frozen product from said sources and into the package.

35. In an apparatus for packaging ice cream for delivery to the ultimate consumers, the combination with a series of sources of supply of the semi-frozen product, of ports operatively connecting with the respective sources, means for positioning a package for cooperation with said ports, and means adapted for causing the flow of predetermined quantities of the semi-frozen product through said ports and into the package so positioned.

36. In an apparatus for packaging ice cream for delivery to the ultimate consumers, the combination with a source of supply of the semi-frozen product, of means for holding a series of packages in assembled relation, and means adapted for causing the flow of the semi-frozen product from said source concurrently into the assembled packages.

37. In an apparatus for packaging ice cream for delivery to the ultimate consumers, the combination with a source of supply of the semi-frozen product, of ports operatively connecting therewith, means for holding a series of packages in cooperation with said ports, and means adapted for causing the flow of the semi-frozen product from said source and through said ports into the assembled packages.

38. In an apparatus for packaging ice cream for delivery to the ultimate consumers, the combination with a source of supply of the semi-frozen product, of ports operatively connecting therewith, means for holding a series of packages in cooperation with said ports, means adapted for causing the flow of the semi-frozen product from said source and through said ports into the assembled packages, and valve means for controlling said ports.

39. In an apparatus for packaging ice cream for delivery to the ultimate consumers, the combination with a series of sources of supply of the semi-frozen product, of means for holding a series of packages in assembled relation, and means adapted for causing the flow of the semi-frozen product from each of said sources and concurrently into said packages.

40. In an apparatus for packaging ice cream for delivery to the ultimate consumers, the combination with a series of sources of supply of the semi-frozen product, of a series of sets of ports, the ports of each set connecting with said sources, and means adapted for causing the flow of the semi-frozen product from said sources through said ports concurrently.

41. In an apparatus for packaging ice cream for delivery to the ultimate consumers, the combination with a container adapted to provide a source of supply of the semi-frozen product, of a port operatively connecting therewith, means for positioning a package for cooperation with said port, means adapted for causing the flow of the semi-frozen product through said port and into the package, means for opening and closing said ports, and a closure at the bottom of said container adapted to prevent the flow of the product therefrom.

42. In an apparatus for packaging ice cream for delivery to the ultimate consumers, the combination with a series of containers adapted to provide sources of supply of the semi-frozen product, of a series of ports, operatively connecting with the respective containers, means for positioning a package for cooperation with said ports, means adapted for causing the flow of the semi-frozen product through said ports and into the package, means for opening and closing said ports, and closures at the bottoms of said containers adapted to prevent the flow of the product therefrom.

43. In an apparatus for packaging ice cream for delivery to the ultimate consumers, the combination with a receiver for the semi-frozen product and provided with an inlet seat, of a port operatively connecting therewith, means for positioning a package for cooperation with said port, means adapted for causing the flow of the semi-frozen product through said port and into the package, and a container for the semi-frozen product and having an outlet adapted for operative connection with said receiver seat in order to be sustained thereon and supply the product thereto.

44. In an apparatus for packaging ice cream for delivery to the ultimate consumers, the combination with a series of receivers for the semi-frozen product and provided with inlet seats, of a series of ports operatively connecting therewith, means for positioning a package for cooperation with said ports, means adapted for causing the flow of the semi-frozen product through said ports and into the package, and a series of containers for the semi-frozen products, each of said containers having an outlet adapted for operative connection with said receiver seats in order to be sustained thereon and supply the product thereto.

In testimony whereof I affix my signature this 21st day of July, 1915.

EDWARD J. RETZBACH.